United States Patent
Dirkse et al.

(10) Patent No.: US 6,830,734 B1
(45) Date of Patent: Dec. 14, 2004

(54) SEPARATOR APPARATUS

(75) Inventors: Hendrik Arien Dirkse, The Hague (NL); Hubertus Wilhelmus Albertus Dries, Amsterdam (NL); Louis Edward Stein, Houston, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 09/831,038

(22) PCT Filed: Nov. 5, 1999

(86) PCT No.: PCT/EP99/08901

§ 371 (c)(1),
(2), (4) Date: May 3, 2001

(87) PCT Pub. No.: WO00/27949

PCT Pub. Date: May 18, 2000

Related U.S. Application Data

(60) Provisional application No. 60/107,420, filed on Nov. 6, 1998.

(51) Int. Cl.[7] ............................................. F27B 15/08
(52) U.S. Cl. ..................... 422/144; 422/145; 422/147
(58) Field of Search .......................... 422/144, 145, 422/147, 139; 55/261, 434, 474

(56) References Cited

U.S. PATENT DOCUMENTS

| | | | | |
|---|---|---|---|---|
| 3,042,202 A | * | 7/1962 | Work ........................ 209/135 |
| 4,313,910 A | * | 2/1982 | Dries et al. .................. 422/147 |
| 4,670,410 A | * | 6/1987 | Baillie ........................... 502/41 |
| 4,695,298 A | * | 9/1987 | Dries ........................... 96/273 |
| 4,961,863 A | * | 10/1990 | Van Den Akker et al. .. 210/788 |
| 5,059,302 A | * | 10/1991 | Weinberg et al. ............. 208/91 |
| 5,282,877 A | * | 2/1994 | Unger et al. .................. 55/484 |
| 5,938,803 A | * | 8/1999 | Dries ........................... 55/337 |

* cited by examiner

Primary Examiner—M. Alexandra Elve
(74) Attorney, Agent, or Firm—Charles W. Stewart

(57) ABSTRACT

A separator apparatus for separating solids from a gas-solid containing feed resulting in a gas-rich stream, the separator comprising an upright hollow circular housing fluidly connected to a dipleg for discharging solids positioned below the housing; a gas outlet tube for discharging the gas-rich stream from the circular housing, which outlet tube protrudes substantially co-axial from the top of the housing; inlet means for the gas-solids feed so arranged to create, in use, a vortex flow in the circular housing; and a sieve positioned between the lower part of the circular housing and the upper part of the dipleg, which sieve has openings which do not allow particles having a diameter greater than 0.75 times the diameter of the dipleg to pass the sieve and enter the dipleg and wherein the total area of the openings in the sieve is greater than 2 times the cross-sectional area of the dipleg.

8 Claims, 2 Drawing Sheets

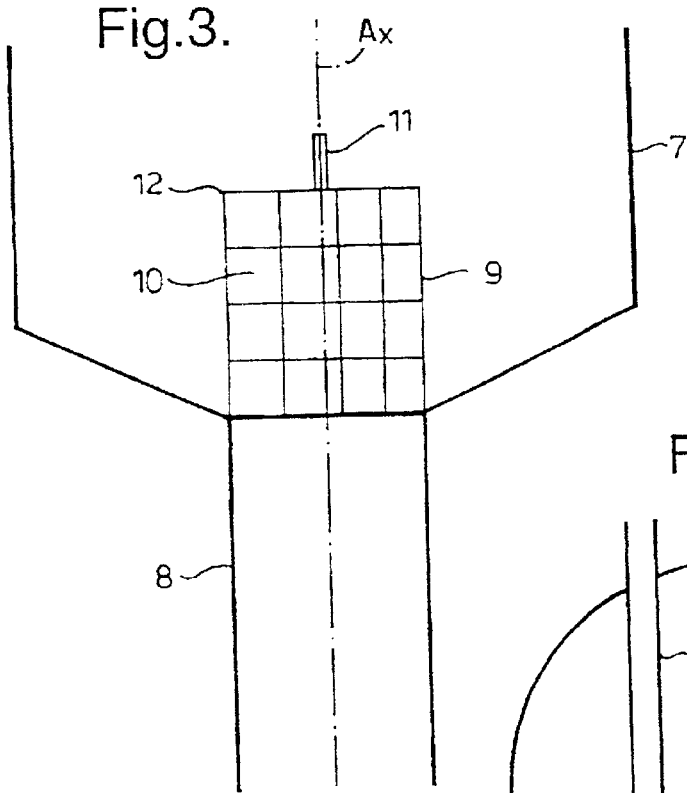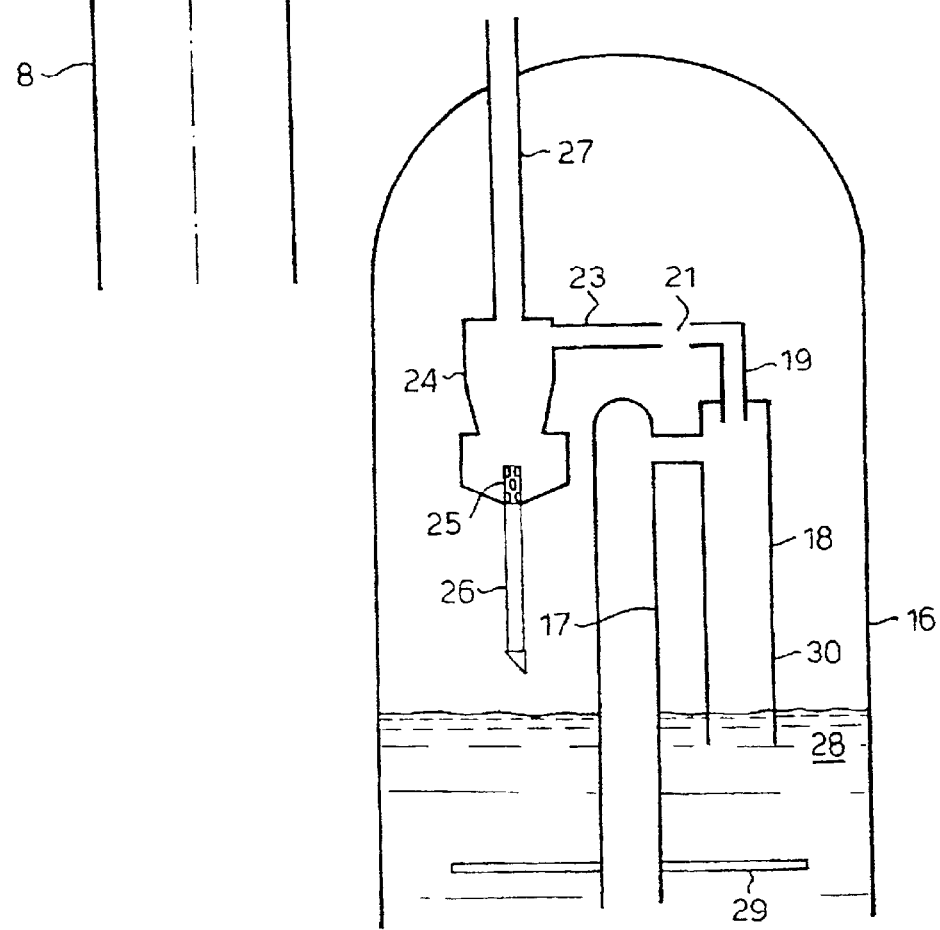

SEPARATOR APPARATUS

This application claims the benefit of Provisional application Ser. No. 60/107,420, filed Nov. 6, 1998.

BACKGROUND OF THE INVENTION

The invention is directed to a separator apparatus for separating solids from a gas-solid containing feed resulting in a gas-rich stream, the separator comprising:

an upright hollow circular housing fluidly connected to a dipleg for discharging solids positioned below the housing;

a gas outlet tube for discharging the gas-rich stream from the circular housing, which outlet tube protrudes substantially co-axial from the top of the housing;

inlet means for the gas-solids feed so arranged to create, in use, a vortex flow in the circular housing.

Such an apparatus is described in U.S. Pat. No. 5,391,289. This patent publication describes a cyclone separator which is used as a secondary separation step to separate solid catalyst particles from the reactor effluent of a fluid catalytic cracking (FCC) reactor. In a FCC process hydrocarbons are cracked at high temperature in the presence of a solid catalyst to more desired components, for example gasoline and lower olefins. In the field of FCC these cyclone separators are also referred to as secondary cyclones. Other publications describing these secondary cyclones in a FCC process are for example U.S. Pat. Nos. 5,055,177, 5,376,339, EP-A-299650, EP-A-488549 and EP-A-309244.

A disadvantage of these secondary cyclones is that coke deposit may form on the walls of these apparatuses. Coke forming is a result of the hydrocarbons present in the feed to the cyclone and the relatively high temperatures of the gasses fed to the cyclones. Large pieces of coke can fall from the wail into the dipleg and cause to clog the dipleg. When a dipleg is clogged the cyclone will not function in an optimal manner as a solid-gas separator and the fluid catalytic cracking process will have to be shut down in order to remove the coke from the dipleg. Because FCC processes are expected to run many months and even years between planned shutdowns any unexpected shutdown will cause considerable economic damage.

The object of this invention is to avoid the problems associated with clogging of the diplegs of the separator apparatus.

SUMMARY OF THE INVENTION

The object is achieved by the following apparatus. A separator apparatus for separating solids from a gas-solid containing feed resulting in a gas-rich stream, the separator comprising:

an upright hollow circular housing fluidly connected to a dipleg for discharging solids positioned below the housing; a gas outlet tube for discharging the gas-rich stream from the circular housing, which outlet tube protrudes substantially co-axial from the top of the housing, inlet means for the gas-solids feed so arranged to create, in use, a vortex flow in the circular housing; and a sieve positioned between the lower part of the circular housing and the upper part of the dipleg, which sieve has openings which do not allow particles having a diameter greater than 0.75 times the diameter of the dipleg to pass the sieve and enter the dipleg and wherein the total area of the openings in the sieve is greater than 2 times the cross sectional area of the dipleg.

It has been found that when such a sieve is used less problems due to clogging of the dipleg occur. Because of the sieve a reduction of the normal swirl movement in the dipleg is observed. As a result the pressure difference per length of dipleg will increase making it possible to use a shorter dipleg. This is very advantageous, especially when these cyclones are present within a vessel, for example a stripping vessel of a FCC process. The length of a dipleg is often the determining factor for the dimensions of the vessel. Thus shorter diplegs result in that smaller vessels can be employed.

BRIEF DESCRIPTION OF THE DRAWINGS

The invention shall be further elucidated by means of the following figures.

FIG. 3 represents a possible embodiment for a sieve combined with a vortex stabiliser.

FIG. 4 represents the upper part of a stripping vessel of a FCC process.

DETAILED DESCRIPTION OF THE INVENTION

Figure 1:
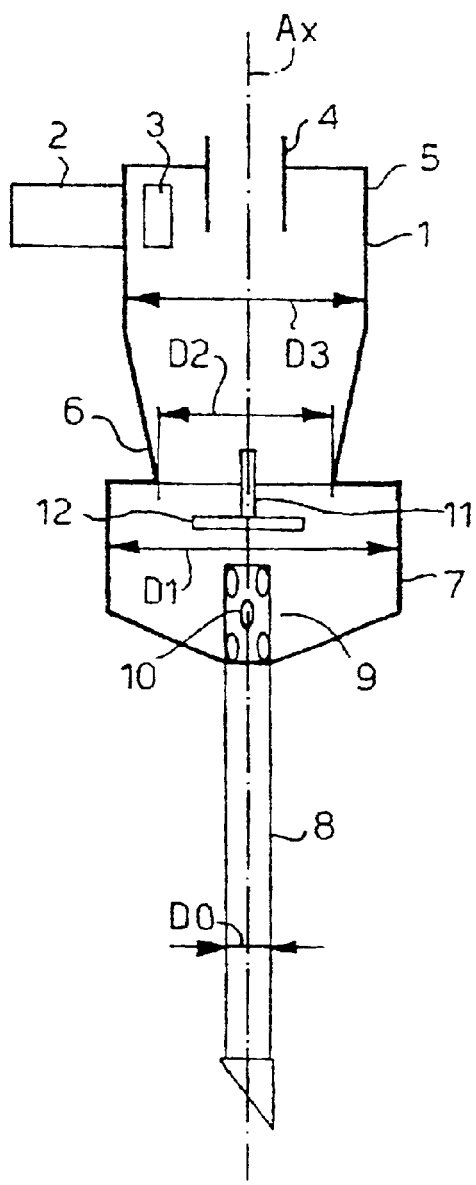
FIG. 1 represent a vertical cross section of the separator apparatus according the invention.

Preferably the openings of the sieve do not allow particles greater than 0.5 times the diameter (D0) of the dipleg to pass the sieve.

Preferably the total area (A0) of the openings of the sieve is greater than 5 times the cross sectional area (A1) of the dipleg.

The circular housing of the separator may suitably have an upper tubular portion with a diameter (D3), a conical formed housing as a middle portion of which smaller diameter (D2) is at the lower end and optionally a lower part having a diameter (D1) which is greater than the diameter (D2) of the lower part of the conical housing. The diameter (D0) of the dipleg is suitably smaller than the diameter (D3) of the upper part of the circular housing of the separator. Preferably the volume of the circular housing at the level where the sieve is located is sufficiently large to allow coke particles to accumulate. The dimensions of the sieve will be so chosen that while coke particles accumulate in the lower part of the housing a sufficiently large number of openings are not blocked in order to allow the separated particles to enter the dipleg. The form of the holes is not very critical. Circular, rectangular holes and slots are possible forms for the openings in the sieve.

The sieve is preferably positioned symmetrically around the axis just on top of the inlet opening of the dipleg. One embodiment of the invention is where the sieve is a tube placed on top of the dipleg which tube protrudes the circular housing from below. The tube has about the diameter of the dipleg and has an open lower end and a closed upper end. In the vertical walls of the tube holes are present.

The sieve is preferably sufficiently strong to avoid it being damaged by erosion due to the gas-solids moving in the circular housing. Protective linings can be applied to protect the upper part of the sieve. A more preferred method of protecting the sieve is by positioning a vortex stabiliser below the opening of the gas outlet tube and above the sieve. The vortex, present in use, will end at the top of the vortex stabiliser thereby reducing erosion of the sieve. The vortex stabiliser will additionally further reduce any swirl movement in the dipleg and thus increases the pressure difference per length of dipleg, which is advantageous for the reasons set out earlier.

The vortex stabiliser comprises suitably of a hat having a relatively large diameter and a vertically oriented vortex stabiliser rod placed on top of the hat having a considerably smaller dimension relative to the hat. The hat may be for example a circular plate or a cone. When a cone is used the top of the cone may function as a vortex stabiliser rod. Vortex stabilisers are also described in for example U.S. Pat. No. 4,692,311, EP-A-360360 and EP-A-220768.

A preferred embodiment is where the vortex stabiliser is placed on top of the sieve.

The vortex stabiliser may have a hollow tube as vortex stabiliser rod, wherein a fluid connection is present via the hollow tube between the top of the vortex stabiliser and a position below the vortex stabiliser and above the inlet of the dipleg.

The inlet means for the gas-solids feed can be axially or tangentially arranged at the upper tubular part of the circular housing.

The apparatus is preferably used as the second separation step (also referred to as secondary cyclone) to separate catalyst particles from a gaseous reactor effluent of a fluid catalyst cracking process in which the separation is conducted in at least two sequential separation steps.

A fluid catalytic cracking process comprises a reactor in which catalyst particles and gaseous hydrocarbons are contacted. The reactor is generally a vertically positioned tubular reactor often referred to as the riser reactor through which catalyst and reactants co-currently flow in an upwards direction. At the end of the riser the catalysts are separated from the reactor effluent. This separation is usually effected by means of one or more cyclones. The thus separated catalysts are collected in a stripping vessel. In this vessel the catalysts are stripped with a water containing gas to separate any hydrocarbons from the catalyst. The stripped catalysts are subsequently send to a regenerator vessel in which any coke is removed from the catalyst by means of combustion. The stripped and regenerated catalyst is reused in the process.

The separation of catalyst from the reactor effluent is suitably performed by means of a first separator which separates the bulk of the catalyst, followed by a secondary cyclone which separates most of the remaining catalyst particles. Depending on the specific layout more than one secondary cyclone may be present operating parallel and/or in series of each other. These separator means may be placed inside the stripping vessel or outside the stripping vessel. Combinations of the two are also possible, wherein the primary separation means is placed inside the stripping vessel and the secondary cyclone is placed outside the stripping vessel. The advantages of the invention are especially apparent when the secondary cyclone is placed inside the stripping vessel because these cyclones cannot be easily inspected when the FCC process is in operation. Examples of such FCC configurations are described in the earlier cited patent publications U.S. Pat. Nos. 5,055,177, 5,391,289, EP-A-309244 and EP-A-299650. If the secondary cyclone is placed inside the stripping vessel the gas-solids feed inlet is preferably tangentially arranged.

Preferably both the primary separation means, suitably a cyclone also referred to as the rough cut cyclone, and the secondary cyclone are placed inside the stripping vessel. More preferably the gas outlet of the rough cut cyclone is in fluid connection with the inlet of the secondary cyclone. This is advantageous because the residence time of the cracked hydrocarbons after they leave the reactor riser in the different separation means is hereby reduced so as to avoid non-controlled cracking also referred to as after cracking. In order to have an outlet means for the stripping gases in the stripping vessel an opening is present in the conduit between the rough cut cyclone and the secondary cyclone. Preferably this opening is effected by a slit.

In FIG. 1 a separator apparatus according the invention is shown having a hollow circular housing (1), symmetrical around an axis (Ax), fluidly connected to a dipleg (8) a gas outlet tube (4), inlet means (3) for the gas-solids feed, tangentially arranged to create, in use, a vortex flow in the circular housing (1). The inlet means (3) is fluidly connected to an inlet conduit (2). The circular housing (1) has upper tubular portion (5) with a diameter (D3), a frusto-conical envelope as a middle portion (6) of which smallest diameter (D2) is at the lower end and a lower part (7) having a diameter (D1). A tubular sieve (9) with circular openings (10) covers the inlet of the dipleg (8). Also shown is a vortex stabiliser (11) positioned on a hat (12).

Figure 2:
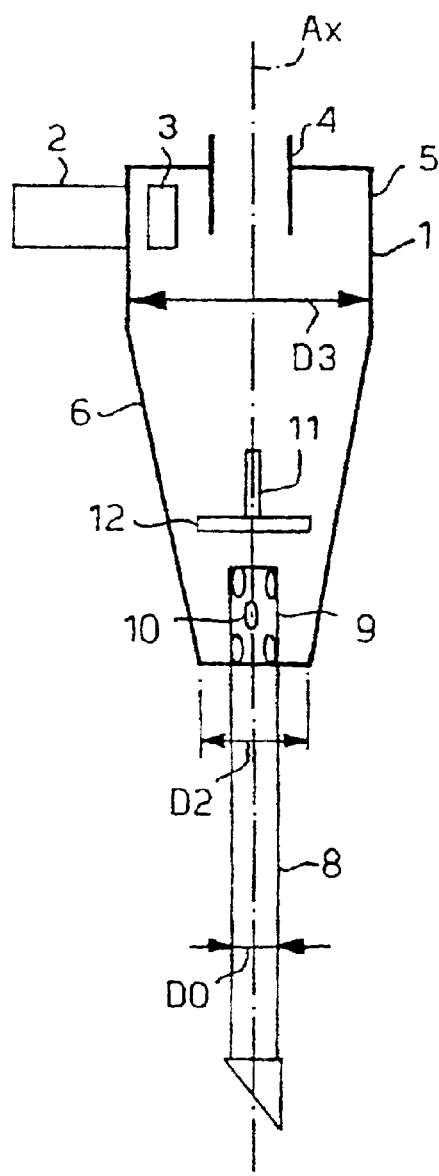
FIG. 2 represents another embodiment of the invention, wherein the lower part of the housing is not present.

In FIG. 2 the numbers have the same meaning as in FIG. 1. The embodiment disclosed in FIG. 2 differs from the one disclosed in FIG. 1 in that no widened lower part of the housing is present.

In FIG. 3 a tubular sieve (9) is shown with rectangular openings (10) covering the inlet of the dipleg (8) placed in the lower part (7) of the housing. On top of the sieve a vortex stabiliser (11) is positioned. The hat(12) of the vortex stabiliser forms the top of the tubular sieve (9).

FIG. 4 represents a preferred stripping vessel (16) of a FCC process having a secondary cyclone according the invention. The upper part of the stripping vessel is shown in which a reactor riser (17) is fluidly connected to a rough cut cyclone (18), which rough cut cyclone is fluidly connected with a gas outlet conduit (19). In the horizontal part of this conduit (19) a slit (21) is present. Conduit (23) is in fluid connection with the tangentially arranged inlet of the secondary cyclone (24). The secondary cyclone (24) has a tubular sieve (25) covering the inlet of the dipleg (26). The gaseous product poor in catalyst particles leave the secondary cyclone and the stripping vessel via conduit (27). The lower part of the stripping vessel comprises a fluid bed of catalyst particles (28) to which stripping gas is supplied to via inlet means (29). The dipleg (26) of the secondary cyclone ends about at the upper level of the fluidized bed (28) and the dipleg of the rough cut cyclone (30) ends within the fluidized bed (28). Through the slit (21) stripping gases can enter the inlet of conduit (23) and leave via the secondary cyclone (24) the stripping vessel (16).

What is claimed is:

1. A separator apparatus for separating solids from a gas-solid containing feed resulting in a gas-rich stream, the separator comprising:

an upright hollow circular housing fluidly connected to a dipleg for discharging solids positioned below the housing;

a gas outlet tube for discharging the gas-rich stream from the circular housing, which outlet tube protrudes substantially co-axial from the top of the housing;

inlet means for the gas-solids feed so arranged to create, in use, a vortex flow in the circular housing;

and a sieve positioned between the lower part of the circular housing and the upper part of the dipleg, which sieve has openings which do not allow particles having a diameter greater than 0.75 times the diameter of the dipleg to pass the sieve and enter the dipleg and wherein the total area of the openings in the sieve is greater than 2 times the cross sectional area of the dipleg.

2. Apparatus according to claim 1, wherein the openings of the sieve do not allow particles greater than 0.5 times the diameter of the dipleg to pass the sieve.

3. Apparatus according to claim 1, wherein the total area of the openings of the sieve is greater than 5 times the cross sectional area of the dipleg.

4. Apparatus according to claim 1, wherein a vortex stabilizer is positioned co-axial to the central axis below the opening of the gas outlet and above the sieve.

5. Apparatus according to claim 4, wherein the vortex stabilizer is placed on top of the sieve.

6. Apparatus according to claim 1, wherein the inlet means for the gas-solids feed are tangentially arranged at the upper part of the circular housing.

7. Apparatus according to claim 1, wherein the sieve is a tube placed on top of the dipleg which tube protrudes the circular housing from below, has about the diameter of the dipleg, has an open lower end and a closed upper end and holes are present in the vertical walls of the tube.

8. Fluid catalyst cracking process in which catalyst particles are separated from a gaseous reactor effluent in at least two sequential separation steps, wherein the apparatus according to claim 1 is used in the second step.

* * * * *